(12) United States Patent
Joshi

(10) Patent No.: US 10,419,208 B2
(45) Date of Patent: Sep. 17, 2019

(54) METHOD AND SYSTEM FOR ENCRYPTING DATA

(71) Applicant: Wipro Limited, Bangalore (IN)

(72) Inventor: Pratik Joshi, Bangalore (IN)

(73) Assignee: Wipro Limited, Bangalore (IN)

( * ) Notice: Subject to any disclaimer, the term of this patent is extended or adjusted under 35 U.S.C. 154(b) by 464 days.

(21) Appl. No.: 15/215,669

(22) Filed: Jul. 21, 2016

(65) Prior Publication Data

US 2017/0353297 A1    Dec. 7, 2017

(30) Foreign Application Priority Data

Jun. 2, 2016 (IN) .............................. 201641018941

(51) Int. Cl.
| | |
|---|---|
| H04L 9/06 | (2006.01) |
| G06F 12/14 | (2006.01) |
| G06F 21/60 | (2013.01) |
| G09C 1/00 | (2006.01) |

(52) U.S. Cl.
CPC ........ *H04L 9/0625* (2013.01); *G06F 12/1408* (2013.01); *G06F 21/602* (2013.01); *G09C 1/00* (2013.01); *H04L 9/06* (2013.01); *G06F 2212/1052* (2013.01); *G06F 2212/402* (2013.01)

(58) Field of Classification Search
None
See application file for complete search history.

(56) References Cited

U.S. PATENT DOCUMENTS

| | | | |
|---|---|---|---|
| 5,276,738 A | | 1/1994 | Hirsch |
| 5,455,577 A | * | 10/1995 | Slivka .................... G06T 9/005 341/51 |
| 8,031,865 B2 | | 10/2011 | Stedron |
| 8,995,659 B2 | | 3/2015 | Sobel |
| 2005/0226408 A1 | * | 10/2005 | Hotz .................... H04L 9/0662 380/28 |
| 2007/0172053 A1 | * | 7/2007 | Poirier ................ G06F 12/1408 380/28 |
| 2015/0007258 A1 | * | 1/2015 | Patey ........................ H04L 9/00 726/1 |

OTHER PUBLICATIONS

Kim, Eungi. "Derivations of Single Hypothetical Dont-Care Minterms Using the Quasi Quine-McCluskey Method." Journal of the Korea Industrial Information Systems Research 18.1 (2013): 25-35. (Year: 2013).*

Extended European Search Report from the European Patent Office in counterpart European Application No. 16192034.3 dated Jun. 2, 2017, 5 pages.

* cited by examiner

*Primary Examiner* — John B King
*Assistant Examiner* — Carlos E Amorin
(74) *Attorney, Agent, or Firm* — Finnegan, Henderson, Farabow, Garrett & Dunner, LLP

(57) ABSTRACT

A method and a system for encrypting data by a data protection system are provided. The data protection system may receive one or more dataset and calculate the number of binary digit '1' in each byte of the one or more dataset. Further, it may determine a slot value for each byte of the one or more dataset based on location of the each byte in a table of the plurality of tables. And, it may identify a pattern index for the each byte based on the location of the each byte in the one or more slots and generates an encrypted byte for the each byte of the one or more dataset. The data protection system may further decrypt the encrypted dataset by receiving one or more encrypted byte.

30 Claims, 10 Drawing Sheets

METHOD AND SYSTEM FOR ENCRYPTING DATA

FIELD OF THE INVENTION

The present subject matter is related in general to field of cryptography, more particularly, but not exclusively to a method and system for encrypting data.

BACKGROUND

With a multi-fold growth of data and increasing use of electronic communication in today's digital world, the enterprises are looking for a better approach of securing data. With the advancement in technology, many methods of cryptography have been generated over the years. Some of the famous approaches for cryptography include for example, Data Encryption Standard (DES), Advanced Encryption Standard (AES) and Blowfish and so forth.

In one of the existing encryption standards i.e., the Data Encryption Standard (DES), the security of the encrypted data largely depends upon the length of the secret key generated, as well as the security of the secret key. With the ever increasing processing power of the desktop systems, the possibilities of decoding the encrypted code using key are increasing.

In another existing encryption standard, i.e., Advanced Encryption standard (AES), same key is utilized for both encryption and decryption. Here, the problem arises while sharing the key with the other party with whom the data is to be shared.

Thus, in the existing scenario, the encryption standards used are not always fool proof. Moreover, the existing standards can be cracked and breached easily by some logics and programs. The available encryption standards follow a certain standard like applying same level of key for multiple communications which may lead to insecure communication. In addition, encrypting data and creating the necessary keys in the existing scenario for encrypting and decrypting the data is computationally expensive. Also, many of the existing standards provide a poor encryption implementation which may result in a false sense of security. In addition, many of the existing encryption standards generate same encrypted data on the same set of data, which can be cracked easily. Consequently, there is a need for a method for encrypting the data without generating the keys to store and transmit data in a secure way.

SUMMARY

In an embodiment, the present disclosure relates to a method for encrypting data. The method comprises receiving one or more dataset, calculating number of binary digit '1' in each byte of the one or more dataset, determining a slot value for the each byte of the one or more dataset based on location of the each byte in a table of the plurality of tables. The contents of each table of the plurality of tables is divided in to one or more slots with each slot of the one or more slots having a pre-defined number of bytes and the slot value, where each table of the plurality of tables is differentiated based on the number of '1' in a byte. The method comprises identifying a pattern index for the each byte based on the location of the each byte in the one or more slots and generating an encrypted byte for the each byte of the one or more dataset comprising the corresponding slot value, a first segment indicative of binary representation of the number of binary digit '1' and a second segment indicative of binary representation of the pattern index.

In an embodiment, the present disclosure relates to a data protection system for encrypting data. The data protection system comprises a processor and a memory communicatively coupled to the processor, wherein the memory stores processor executable instructions, which, on execution, causes the data protection system to receive one or more dataset, calculate number of binary digit '1' in each byte of the one or more dataset, determine a slot value for the each byte of the one or more dataset based on location of the each byte in a table of the plurality of tables. The contents of each table of the plurality of tables is divided in to one or more slots with each slot of the one or more slots having a pre-defined number of bytes and the slot value, where each table of the plurality of tables is differentiated based on the number of '1' in a byte. The data protection system identifies a pattern index for the each byte based on the location of the each byte in the one or more slots and generates an encrypted byte for the each byte of the one or more dataset comprising the corresponding slot value, a first segment indicative of binary representation of the number of binary digit '1' and a second segment indicative of binary representation of the pattern index.

In an embodiment, the present disclosure relates to a non-transitory computer readable medium including instructions stored thereon that when processed by at least one processor cause a data protection system to receive one or more dataset, calculate number of binary digit '1' in each byte of the one or more dataset, determine a slot value for the each byte of the one or more dataset based on location of the each byte in a table of the plurality of tables, wherein the contents of each table of the plurality of tables is divided in to one or more slots with each slot of the one or more slots having a pre-defined number of bytes and the slot value, wherein each table of the plurality of tables is differentiated based on the number of '1' in a byte, identify a pattern index for the each byte based on the location of the each byte in the one or more slots and generate an encrypted byte for the each byte of the one or more dataset comprising the corresponding slot value, a first segment indicative of binary representation of the number of binary digit '1' and a second segment indicative of binary representation of the pattern index.

In another embodiment, the present disclosure relates to a method for decrypting encrypting data. The method comprises receiving one or more encrypted byte comprising a first segment and a second segment, along with a slot value. The first segment and the second segment comprises of binary representation of the number of binary digit '1' and binary representation of the pattern index respectively. The method comprises identifying number of binary digit '1' from the first segment of the one or more encrypted byte, identifying a table of one or more bytes from a plurality of tables based on occurrence of the number of binary digit '1' and generating a decrypted byte for each of the one or more encrypted byte by fetching a byte from the identified table using the slot value and the pattern index to identify location of the byte.

In an embodiment, the present disclosure relates to a data protection system for decrypting encrypted data. The data protection system comprises a processor and a memory communicatively coupled to the processor, wherein the memory stores processor executable instructions, which, on execution, causes the data protection system to receive one or more encrypted byte comprising a first segment and a second segment, along with a slot value. The first segment and the second segment comprises of binary representation of the number of binary digit '1' and binary representation of the pattern index respectively. The data protection system identify number of binary digit '1' from the first segment of the one or more encrypted byte, identify a table of one or more bytes from a plurality of tables based on occurrence of the number of binary digit '1' and generates a decrypted byte for each of the one or more encrypted byte by fetching a byte from the identified table using the slot value and the pattern index to identify location of the byte.

In an embodiment, the present disclosure relates to a non-transitory computer readable medium including instructions stored thereon that when processed by at least one processor cause a data protection system to receive one or more encrypted byte comprising a first segment and a second segment, along with a slot value, wherein the first segment and the second segment comprises of binary representation of the number of binary digit '1' and binary representation of the pattern index respectively, identify number of binary digit '1' from the first segment of the one or more encrypted byte, identify a table of one or more bytes from a plurality of tables based on occurrence of the number of binary digit '1' and generate a decrypted byte for each of the one or more encrypted byte by fetching a byte from the identified table using the slot value and the pattern index to identify location of the byte.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
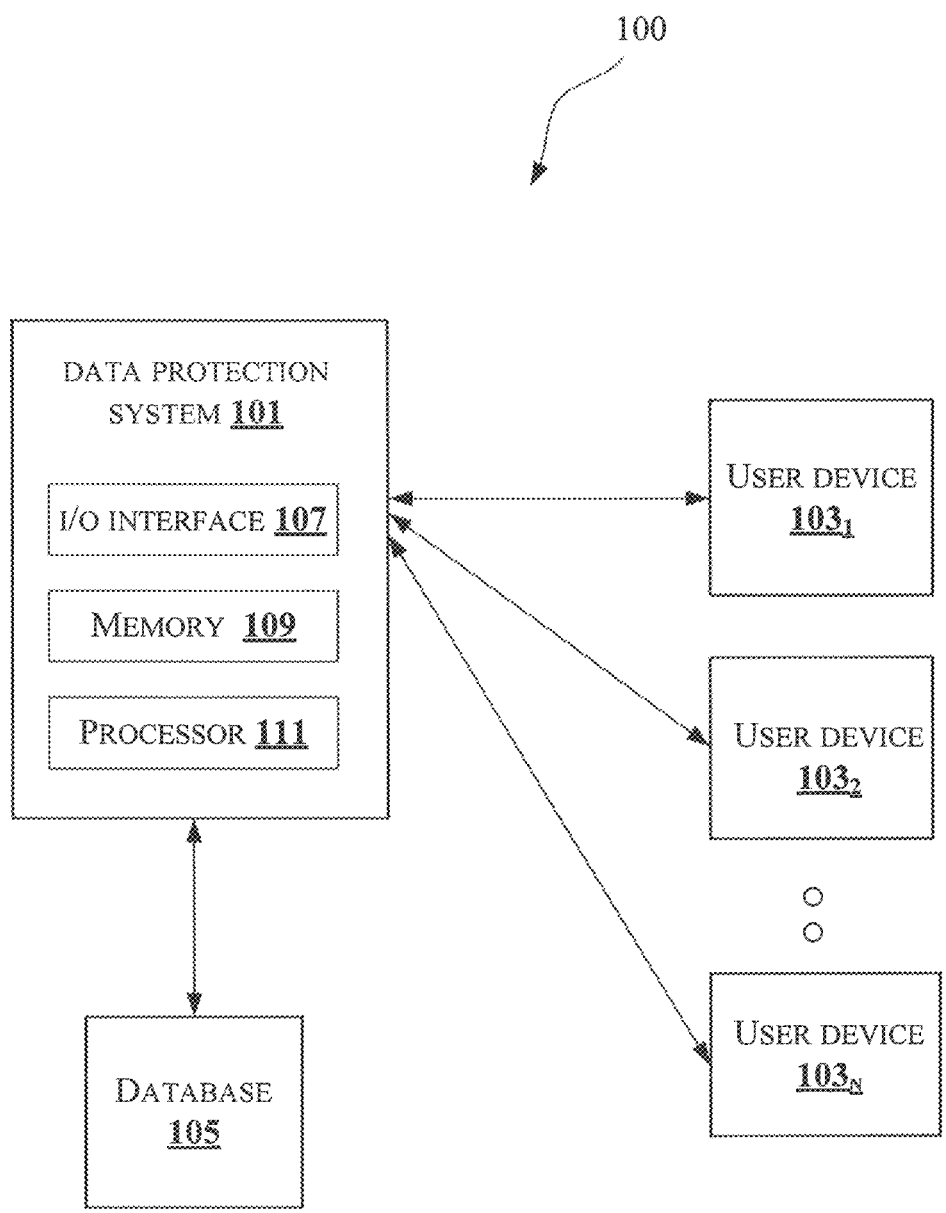
FIG. 1 illustrates an exemplary environment for encrypting data in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for encrypting data. The method determines an encrypted dataset for one or more dataset received. The present disclosure provides a data protection system which generates a powerful and efficient encryption of the dataset based on a plurality of tables and slot values. In an embodiment, each dataset comprises one byte of data in binary format. The plurality of tables as well as the slot values may be defined and changed anytime, thereby providing more security to the encrypted dataset. The plurality of tables is divided in to one or more slots, where each slot has a pre-defined number of contents and a slot value. The present disclosure generates the encrypted dataset comprising a combination of a first segment, which comprises binary representation of the number of binary digit '1' occurring in the received dataset and a second segment which comprises binary representation of a pattern index identified based on the slot value. Once the one or more dataset is encrypted, the decryption of the encrypted dataset is carried out based on the corresponding slot values and the plurality of tables. In another embodiment, the present disclosure relates to a method for decrypting one or more encrypted dataset. The decryption is performed by the data protection system. The data protection system decrypts the one or more encrypted dataset based on the corresponding slot value and by referring the plurality of tables in order to provide the original dataset.

FIG. 1 illustrates an exemplary environment for encrypting data in accordance with some embodiments of the present disclosure.

As shown in FIG. 1, the environment 100 comprises a data protection system 101 connected to a user device 103$_1$, user device 103$_2$ . . . user device 103$_N$ (collectively referred as one or more user devices 103) and a database 105. In an embodiment, the one or more user devices 103 include, but are not limited to, desktop computers, laptops, mobile phones, Personal Computers (PC), tablets and any other computing device. The data protection system 101 receives one or more dataset from the one or more user devices 103 for encryption. In an embodiment, the data protection system 101 may reside in the user devices 103 and the one or more dataset for encryption may be directly entered by users into the data protection system 101. In such case, the data protection system 101 present in the user devices 103 encrypts the dataset entered by the users and transfers the encrypted data to either database 105 or other one or more user devices 103 based on the request. In an embodiment, the database 105 may be connected to the data protection system 101 through a communication network 113 (not shown in figure). In another embodiment, the data protection system 101 receives the dataset for encryption from the user device 103$_1$ and transmits the encrypted data to the other one or more user devices 103. Once the one or more dataset to be encrypted is received by the data protection system 101 from the one or more user devices 103 or directly entered by users, into the data protection system 101, the data protection system 101 calculates the number of binary digit '1' in each byte of the one or more dataset. In an embodiment, the number of binary digit '1' is less than eight. The data protection system 101 generates a plurality of tables which comprises one or more patterns and each table is divided in to one or more slots. Each slot of the plurality of tables comprises a predefined number of bytes. The plurality of tables is stored in the database 105. The plurality of tables is generated based on the number of binary digit '1'. i.e, the patterns of the plurality of tables are differentiated based on the number of binary digit '1'. For example, the first table comprise a pattern with zero number of binary digit '1'. In an embodiment, the plurality of tables may not be generated each time the encryption is carried out. The number of binary digit '1' in each dataset is used for identifying a table from the plurality of tables. Further, the slot value and the number of binary digit '1' are utilized for identifying the pattern index for each dataset. The encrypted byte comprises the corresponding slot value, first segment and second segment. The first segment represents the number of binary digit '1' and the second segment represents the pattern index identified. After encryption of the one or more dataset, the data protection system 101 may decrypt the encrypted dataset. The method for decrypting an encrypted dataset is provided in another embodiment of the present disclosure. Once an encrypted dataset is received for decryption, the data protection system 101 identifies the number of binary digit '1' from the first segment of the encrypted dataset. The received encrypted dataset comprises a first segment of three bits, a second segment of five bits along with the corresponding slot value. Based on the number of binary digit '1', the data protection system 101 identifies a table of one or more patterns from the plurality of already generated tables. After the table is identified, the data protection system 101 generates the decrypted dataset for each of the encrypted dataset by fetching a byte from the identified table using the corresponding slot value and the second segment of the encrypted dataset for identifying the location of the byte.

The data protection system 101 comprises an I/O Interface 107, a memory 109 and a processor 111. The I/O interface 107 is configured to receive the one or more dataset from the one or more user devices 103 for encryption. The I/O interface 107 also receives one or more encrypted dataset for decryption from database 105.

The received information from the I/O interface 107 is stored in the memory 109. The memory 109 is communicatively coupled to the processor 111 of the data protection system 101. The memory 109 also stores processor instructions which cause the processor 111 to execute the instruction in order to encrypt/decrypt the data.

Figure 2A:
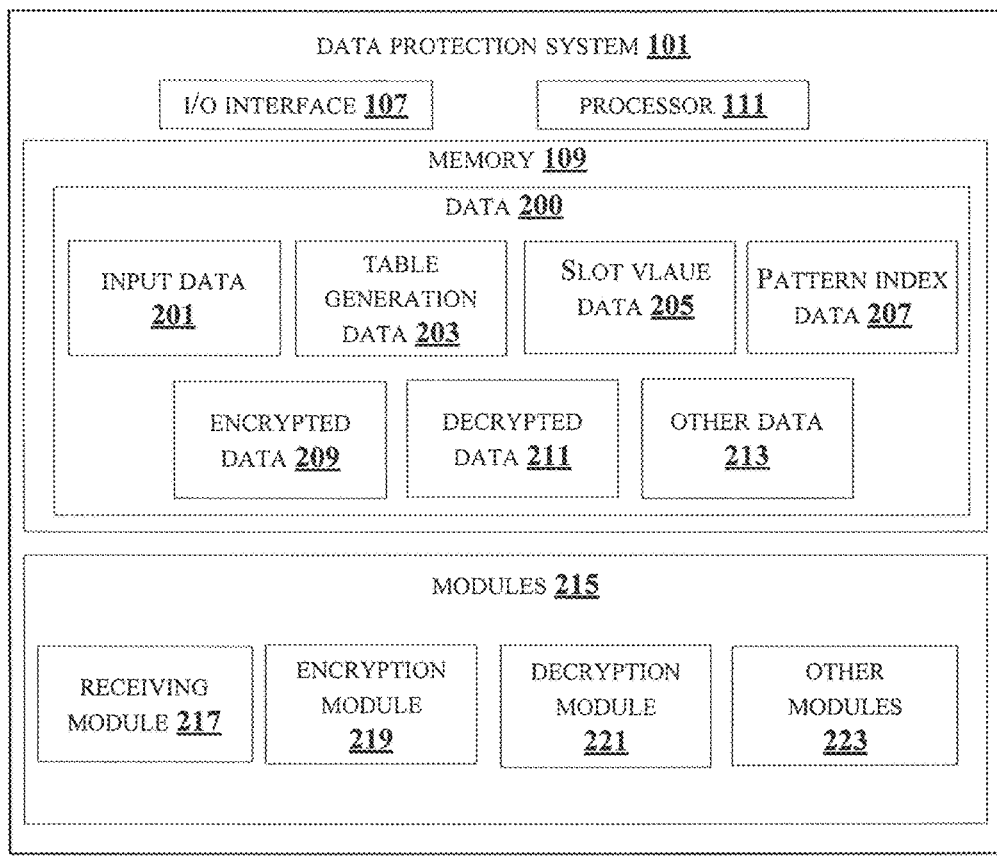
FIG. 2a shows a detailed block diagram illustrating a data protection system in accordance with some embodiments of the present disclosure.

FIG. 2a shows a detailed block diagram illustrating a data protection system in accordance with some embodiments of the present disclosure.

One or more data 200 and one or more modules 215 of the data protection system 101 are described herein in detail. In an embodiment, the one or more data 200 comprises input data 201, table generation data 203, slot value data 205, pattern index data 207, encrypted data 209, decrypted data 211 and other data 213 for encrypting the data.

The input data 201 comprises one or more dataset for the encryption. The input data 201 is received from the one or more user devices 103. In an embodiment, the input data 201 may also be received directly into the data protection system 101 from users. Each of the one or more dataset comprises one byte of data. Further, the input data 201 for the decryption comprises one or more encrypted dataset, where each of the encrypted dataset comprises one byte of encrypted data along with the two bits of slot value.

The table generation data 203 comprise information about the plurality of tables used for encryption and decryption. I. The plurality of tables comprises one or more patterns of a byte. Each table of the plurality of tables is differentiated based on the number of '1's.

The slot value data 205 comprises information about the one or more slots in the plurality of tables. The plurality of tables is divided into one or more slots, where each slot comprises a pre-defined number of patterns and a slot value. The slot values may be one of first slot value, second slot value and third slot value. Table 1 below shows the values of the first, second and third slot values. Further, the first slot value, the second slot value and the third slot value are assigned with a pre-defined decimal number based on the range of the slots. For example, first slot resides in the range of 0-31, second, slot resides in the range of 32-61 and third slot resides in the range of 62 and above. In an embodiment, the pre-defined decimal number for the first, the second and the third slot values are '0', '31' and '61' respectively.

TABLE 1

| Slot value | Representation |
|---|---|
| First slot | 00 |
| Second slot | 01 |
| Third slot | 10 |

The pattern index data 207 comprises information about the second segment of the encrypted dataset. The pattern index of the encrypted dataset is determined based on the allotted slot and a location number of the byte of the dataset in the table. The second segment of the encrypted and decrypted data comprises five bits of data.

The encrypted data 209 comprises an encrypted byte of the received one or more dataset. The encrypted data 209 is a combination of first segment which indicates the number of binary digit '1' of the input data 201 and a second segment which comprises the pattern index. Further, the encrypted byte comprises the slot value of two bits for the received one or more dataset. The first segment and the second segment of the encrypted data 209 comprise three bits and five bits respectively. The decrypted data 211 comprises the decrypted byte of the encrypted data 209. The decrypted data 211 is the original input data 201.

The other data 213 may store data, including temporary data and temporary files, generated by modules for performing the various functions of the data protection system 101.

In an embodiment, the one or more data 200 in the memory 109 are processed by the one or more modules 215 of the data protection system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

In one implementation, the one or more modules 215 may include, for example, a receiving module 217, an encryption module 219 and a decryption module 221.

The one or more modules 215 may also comprise other modules 223 to perform various miscellaneous functionalities of the data protection system 101. It will be appreciated that such aforementioned modules may be represented as a single module or a combination of different modules.

The receiving module 217 receives one or more dataset for encryption from the one or more user devices 103. In an embodiment, if the data protection system 101 resides in the user devices 103, the one or more dataset may also be received directly into the data protection system 101 from users. The receiving module 217 also receives one or more encrypted data 209 from one or more user devices 103 and database 105 for decryption.

Figure 2B:
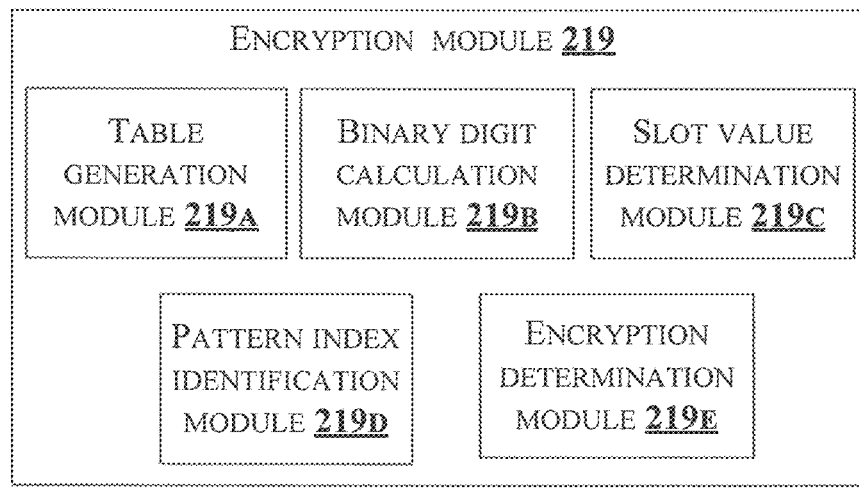
FIG. 2b shows a block diagram illustrating an encryption module in accordance with some embodiments of the present disclosure.

The encryption module 219 encrypts one or more dataset received from the user devices 103 or from the users directly in the data protection system 101 for encryption. FIG. 2b shows a block diagram illustrating an encryption module in accordance with some embodiments of the present disclosure. As shown in FIG. 2b, the encryption module 219 comprises plurality of sub-modules for encrypting the dataset as shown in FIG. 2b namely, table generation module $219_A$, binary digit calculation module $219_B$, slot value determination module $219_C$, pattern index identification module $219_D$ and encryption determination module $219_E$.

The table generation module $219_A$ generates a plurality of tables of plurality of bytes. The plurality of tables is generated based on the number of the binary digit '1'. In an embodiment, Table 2 below indicates the plurality of tables. Further, each of the table and the slots may be defined and changed anytime by reversing the indexes in the plurality of tables, swapping the patterns etc. For example, we can denote any pattern and indexes in a table and the slot values are changed to annotate different meaning. In an embodiment, the indexes of the plurality of tables represent the location number where the patterns reside. The indexes of the plurality of tables may also be referred as location value. In an embodiment, the indexes and location value are interchangeably used. For zero '1''s in a dataset: maximum number of patterns possible: 1

TABLE 2

| Index | Pattern |
|---|---|
| 1. | 00000000 |

For 1: '8' patterns (slot '00': 1-8)

| 1. | 00000001 | 00000010 | 00000100 | 00001000 | 00010000 | 00100000 | 01000000 | 10000000 |
|---|---|---|---|---|---|---|---|---|

For 2: '28' patterns (slot '00': 1-28)

| 1. | 00000011 | 00000101 | 00000110 | 00001001 | 00001010 | 00001100 | 00010001 |
|---|---|---|---|---|---|---|---|
| 8. | 00010010 | 00010100 | 00011000 | 00100010 | 00100100 | 00101000 | 00110000 |
| 15. | 00110000 | 01000001 | 01000010 | 01000100 | 01001000 | 01010000 | 01100000 |
| 22. | 10000001 | 10000010 | 10000100 | 10001000 | 10010000 | 10100000 | 11000000 |

For 3: '56' patterns (slot '00': 1-31) + slot "01" (32-56)

| 1 | 00000111 | 00001011 | 00001101 | 00001110 | 00010011 | 00010101 | 00010110 |
|---|---|---|---|---|---|---|---|
| 8. | 00011001 | 00011010 | 00011100 | 00100011 | 00100101 | 00100110 | 00101001 |
| 15. | 00101010 | 00101100 | 00110001 | 00110010 | 00110100 | 00111000 | 01000011 |
| 22. | 01000101 | 01000110 | 01001001 | 01001010 | 01001100 | 01010001 | 01010010 |
| 29. | 01010100 | 01011000 | 01100001 | 01100010 | 01100100 | 01101000 | 01110000 |
| 36. | 10000011 | 10000101 | 100000110 | 10001001 | 10001010 | 10001100 | 10010001 |
| 43. | 10010010 | 10010100 | 10011000 | 10100001 | 10100010 | 10100100 | 10101000 |
| 50. | 10110000 | 11000001 | 11000010 | 11000100 | 11001000 | 11010000 | 11100000 |

TABLE 2-continued

| For 4: '70' patterns (slot '00': 1-31) + slot "01" (32-61) + slot '10'(62-70) | | | | | | | |
|---|---|---|---|---|---|---|---|
| 1. | 00001111 | 00010111 | 00011011 | 00011101 | 00011110 | 00100111 | 00101011 |
| 8. | 00101101 | 00101110 | 00110011 | 00110101 | 00110110 | 00111001 | 00111010 |
| 15. | 00111100 | 01000111 | 01001011 | 01001101 | 01001110 | 01010011 | 01010101 |
| 22. | 01010110 | 01011001 | 01011010 | 01011100 | 01100011 | 01100101 | 01100110 |
| 29. | 01101001 | 01101010 | 01101100 | 01110001 | 01110010 | 01110100 | 01111000 |
| 36. | 10000111 | 00001011 | 10001101 | 10001110 | 10010011 | 10010101 | 10010110 |
| 43. | 10011001 | 10011010 | 10011100 | 10100011 | 10100101 | 10100110 | 10101001 |
| 50 | 10101010 | 10101100 | 10110001 | 10110010 | 10110100 | 10111000 | 11000011 |
| 57. | 11000101 | 11000110 | 11001001 | 11001010 | 11001100 | 11010001 | 11010010 |
| 64. | 11010100 | 11011000 | 11100001 | 11100010 | 11100100 | 11101000 | 11110000 |
| For 5: '56' patterns (slot '00': 1-31) + slot "01" (32-56) | | | | | | | |
| 1. | 00011111 | 00101111 | 00110111 | 00111011 | 00111101 | 00111110 | 01001111 |
| 8. | 01010111 | 01011011 | 01011101 | 01011110 | 01100111 | 01101011 | 01101101 |
| 15. | 01101110 | 01110011 | 01110101 | 01110110 | 01111001 | 01111010 | 01111100 |
| 22. | 10001111 | 10010111 | 10011011 | 10011101 | 10011110 | 10100111 | 10101011 |
| 29. | 10101101 | 10101110 | 10110011 | 10110101 | 10110110 | 10111001 | 10111010 |
| 36. | 10111100 | 11000111 | 11001011 | 11001101 | 11001110 | 11010101 | 11010101 |
| 43. | 11010110 | 11011001 | 11011010 | 11011100 | 11100011 | 11100101 | 11100110 |
| 50. | 11101001 | 11101010 | 11101100 | 11110001 | 11110010 | 11110100 | 11111000 |
| For 6: '28' patterns (slot '00': 1-28) | | | | | | | |
| 1. | 00111111 | 01011111 | 01101111 | 01110111 | 01111011 | 01111101 | 01111110 |
| 8. | 10011111 | 10101111 | 10110111 | 10111101 | 10111101 | 10111110 | 11001111 |
| 15. | 11010111 | 11011011 | 11011101 | 11100111 | 11100111 | 11101011 | 11101101 |
| 22. | 11101110 | 11110011 | 11110101 | 11110110 | 11111001 | 11111010 | 11111100 |
| For 7: '8' patterns (slot '00': 1-8) | | | | | | | |
| 1. | 01111111 | 10111111 | 11011111 | 11101111 | 11110111 | 11111011 | 11111101 |
| 8. | 11111110 | | | | | | |
| For 8: '1' | | | | | | | |
| 1. | | | | 11111111 | | | |

The binary digit calculation module $219_B$ calculates the number of binary digit '1' in the received one or more dataset. The number of binary digit '1' is used in identifying a table from the plurality of tables for encrypting the data. For example, the received dataset comprises '00011100' byte, the number of binary digit '1' in the byte are calculated to be three, then the table comprising patterns with three number of binary digit '1''s is identified.

The slot value determination module $219_C$ determines a slot value for each of the one or more dataset received for encryption. The slot value determination module $219_C$ determines the slot value to be one of first slot value, the second slot value and the third slot value. The slot value determination module $219_C$ determines the slot for corresponding dataset by comparing the byte of each dataset with each bytes of the identified table. As explained in binary digit calculation module $219_B$, the table from the plurality of tables is identified based on the occurrence of binary digit '1'. Table 2 above shows the plurality of tables with indicated slots. In an embodiment, the slot value is used in determining the second segment of the encrypted dataset. In an embodiment, the second segment represents a pattern index of maximum value '31' ('11111' in binary=31 in decimal). Further, since the second segment exceeds more than '31' only when the number of binary digit '1' is in indexes corresponding to '3', '4' and '5' in the Table 2. These three tables are having more than '31' patterns individually and are divided into slots. In an embodiment, each slot may represent a maximum of '31' patterns. The number of slots for each table is shown in Table 3.

TABLE 3

| Table | Slot |
|---|---|
| 1 | 1 |
| 2 | 1 |
| 3 | 2 |
| 4 | 3 |
| 5 | 2 |
| 6 | 1 |
| 7 | 1 |
| 8 | 1 |

Based on the Table 3, table 1, 2, 6, 7 and 8 of the plurality of tables shown in Table 2 comprise one slot. Whereas, table3 and table5 of the plurality of tables of table 2 comprises two slots each and table 4 of the plurality of tables has three slots. In an embodiment, two bits are associated with each slot value. The first, the second and the third slot value are represented in below Table 4.

TABLE 4

| Slot value | Representation | Pre-defined range |
|---|---|---|
| 1 | 00 | 0 to 31 |
| 2 | 01 | 32 to 61 |
| 3 | 10 | 62 and above |

Further, the slot value determination module $219_C$ determines the slots for each dataset by comparing the dataset with all the patterns of the identified table of plurality of tables as shown in Table 2. The comparison is performed in order to identify a location value of the dataset in the table 2. Further, upon determining the location value, the slot value determination module $219_C$ follows the below pre-defined steps to determine the slot value.

The slot value is '00', if location value ≤31 and number of '1's not equal to 8

Slot value is '01', if location value ≤31 and number of '1's equal to 8

Slot value is '01', if 32≤location value ≤61

Slot value is '10', location value ≥62.

The pattern index identification module $219_D$ identifies the pattern index value of the dataset based on the slot value determined by the slot value determination module $219_C$ and the location value identified for each dataset. The pattern index indicates the second segment of the encrypted dataset. The pattern index identification module $219_D$ identifies the pattern index for the dataset by subtracting the pre-defined number of the respective slot with the location number of the each byte of the dataset in the table. The location number is identified based on the location of the byte in the table. For example, consider a dataset '10000101', table 3 from the plurality of tables of Table 2 is identified based on three binary digit '1'. Further, the location number of the dataset is determined to be at '37' index based on the comparison of the dataset with each byte of the table 3. Based on the table 3 and location number, slot value is determined to be the second slot value i.e., '01'. Therefore, the pre-defined value of '31' for the second slot is subtracted with the location number i.e., '37', and the pattern index is identified based on the subtraction to be six.

Figure 3A:
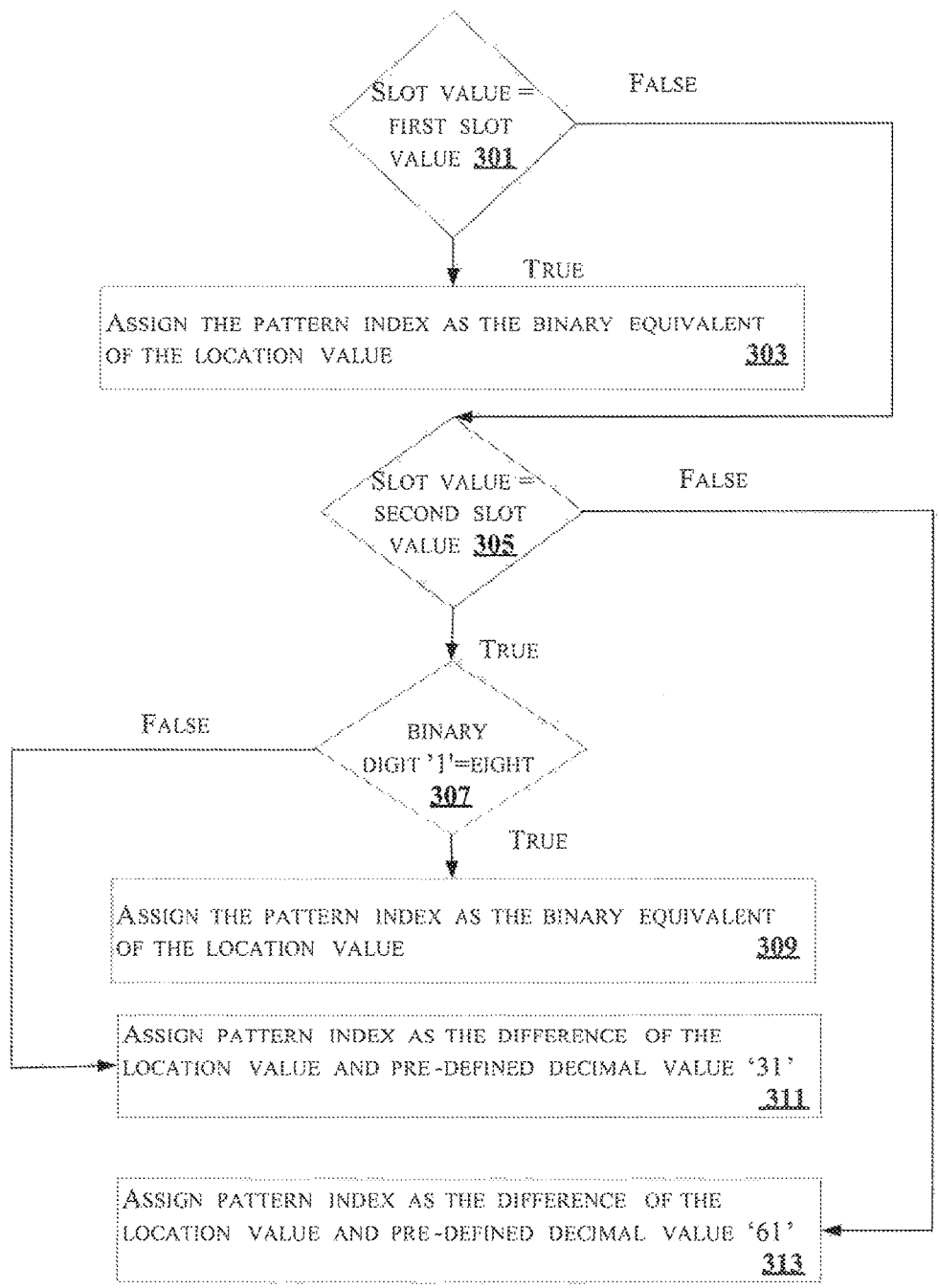
FIG. 3a illustrates a flowchart showing a method for identifying the pattern index of an encrypted dataset in accordance with some embodiments of present disclosure.

FIG. 3a illustrates a flowchart showing a method for identifying the pattern index of an encrypted dataset in accordance with some embodiments of present disclosure.

At block 301, if the slot value is identified to be first slot value, the method proceeds to block 303. Alternatively, if the slot value is not first slot value, the method proceeds to block 305.

At block 303, the pattern index identification module $219_D$ assigns the patterns index to be binary equivalent of the location value. At block 305, if the slot value is identified by the pattern index identification module $219_D$ as the second slot value, the method proceeds to block 307. Alternatively, if the slot value is not the second slot value, the method proceeds to block 313.

At block 307, if the number of binary digit '1' in the dataset equals eight, the method proceeds to block 309. Alternatively, if the number of binary digit '1' is not equal to eight, then method proceeds to block 311.

At block 309, the pattern index identification module $219_D$ assigns the pattern index value as the binary equivalent of the location value.

At block 311, the pattern index identification module $219_D$ determines the pattern index value as the difference between the location value and the pre-defined decimal value '31'.

At block 313, the pattern index identification module $219_D$ determines the pattern index value as the difference between the location value and the pre-defined decimal value '61'.

Returning back to FIG. 2b, the encryption determination module $219_E$ generates the encryption dataset. The encryption determination module 219E generates the first bit of the encrypted dataset based on the calculation of the binary digit calculation module $219_B$. The first segment of the encrypted dataset is represented with the number of binary digit '1' in the dataset. For example, consider a dataset '10000101', the number of binary digit '1' is calculated as three, therefore the first segment of the encrypted byte is represented as '011', which indicates binary representation of three. Further, the dataset '10000101' is checked and compared with each byte present in the table 3 of the plurality of tables. Based on the comparison, the dataset is identified at index '37', which falls under second slot. Therefore the slot value for the dataset is '01'. Once the slot value is identified, the pattern index or the second segment of the encrypted dataset is identified. Since, the slot is the second slot and the number of binary digit '1' in the dataset '10000101' is not equal to eight, the pattern index is determined by subtracting the identified index value '37' with the pre-defined range of second slot value i.e. 31. The resultant value is six, which is indicated as the pattern index. The encrypted dataset for the dataset '10000101' is determined as '01100110', where the first segment is '011' and the second segment is '00110'.

Figure 2C:
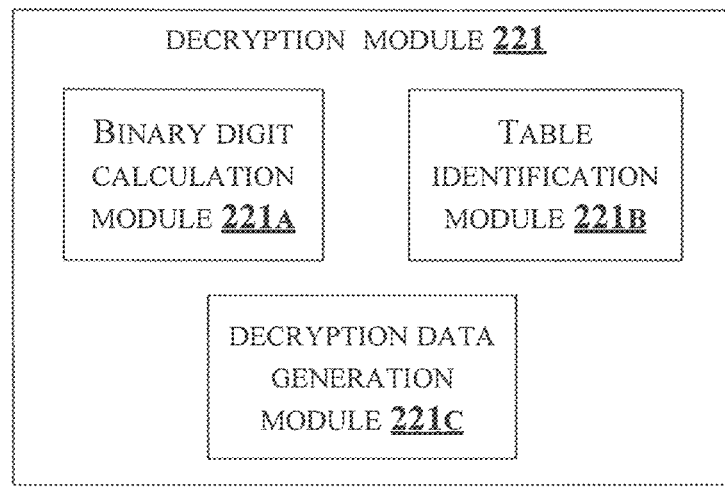
FIG. 2c shows a block diagram illustrating a decryption module in accordance with some embodiments of the present disclosure.
Figure 2D:
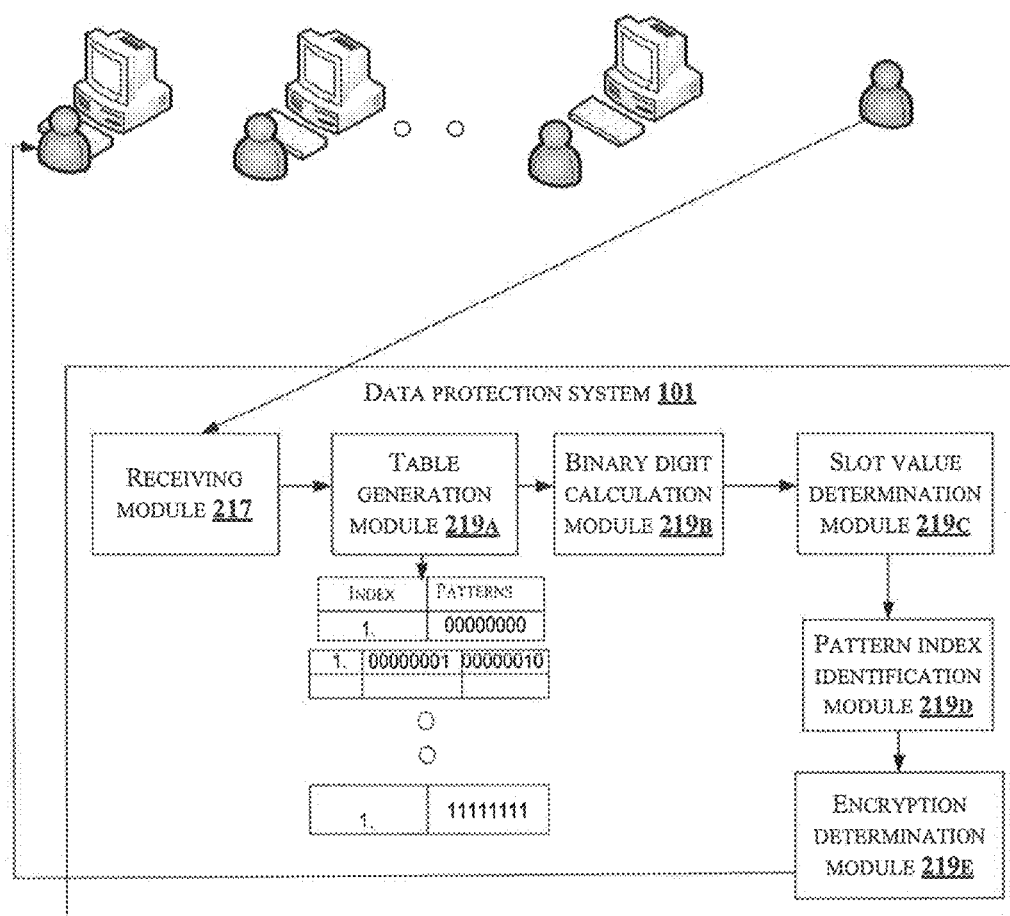
FIG. 2d shows an exemplary environment illustrating data flow between different modules of data protection system for encryption in accordance with some embodiment of the present disclosure.

Further, in cases when the number of binary digit '1' is equal to eight, the encryption determination module $219_E$ generates the corresponding encrypted dataset by allocating the slot value to be the second slot value and the first segment to be the binary representation of seven and the second segment of five bits with representation of zeros. For example, consider dataset '11111111', the number of binary digit '1' is calculated to be eight. Since the first segment of the encrypted dataset represents a maximum value of seven. But as the number of binary digit '1' is eight, the slot value is taken as second slot value i.e, '01' and first segment is represented as '111'. Since, there are no bytes in the second slot of the table 7 of the plurality of tables, the pattern index is filled with binary representation of zeros i.e, '00000'. The encrypted dataset for the dataset '11111111' is '11100000', where '111' represents the first segment and '00000' represents the second segment of the encrypted dataset. FIG. 2d shows an exemplary environment illustrating data flow between different modules of data encryption system for encryption in accordance with some embodiment of the present disclosure.

Returning back to FIG. 2a, the decryption module 221 decrypts the encrypted dataset received from the user devices 103 and/or from database 105. FIG. 2c shows a block diagram illustrating a decryption module in accordance with some embodiments of the present disclosure. As shown in FIG. 2c, the decryption module 221 comprises a plurality of sub-modules namely, binary digit calculation module $221_A$, table identification module $221_B$ and decryption data generation module $221_C$ The binary digit calculation module $221_A$ calculates the number of binary digit '1' in the first segment of the encrypted dataset in decimal format. For example, consider an encrypted dataset '01100110' and the corresponding slot value '01'. The binary digit calculation module $221_A$ calculates the number of binary digit '1' from the first segment i.e. '011' of the encrypted dataset as three.

The table identification module 221 identifies a table from the plurality of tables as shown in table 2 based on the calculation of the binary digit '1' by the binary digit calculation module $221_A$. For example, if the number of binary digit '1' is calculated to be three as shown in above example, then the table comprising patterns with number of binary digit '1' as three is identified. In this case, the table 3 of the plurality of tables as shown in table 2 is identified.

The decryption dataset generation module $221_C$ generates a decrypted dataset for the encrypted dataset. Once the table is identified by the table identification module $221_B$, the decryption dataset generation module $221_C$ determines the decrypted byte based on the slot value. The decryption dataset generation module $221_C$ further determines the decimal equivalent of the second segment of the received encrypted dataset. For example, consider an encrypted byte '01100110' and the corresponding slot byte '01'. The first segment of the encrypted byte is '011', which is the binary representation of three and second segment is '00110', which is the binary representation of six. This indicates that the decrypted byte comprises three binary digit '1'. Further, the table comprising patterns with number of binary digit '1' as three is identified and referred. Once the table is identified, the corresponding slot value of the encrypted byte is checked. The slot value is '01' which is the second slot value and present in the range of 32-61. Further, as the number of binary digit '1' is identified as less than seven, the pre-defined value '31' is added with the decimal equivalent of second segment, which is six. The resulting value is '37' which indicates the location value for the decrypted byte. The location value comprises '10000101' pattern index at the '37' position which is the decrypted byte.

Figure 3B:
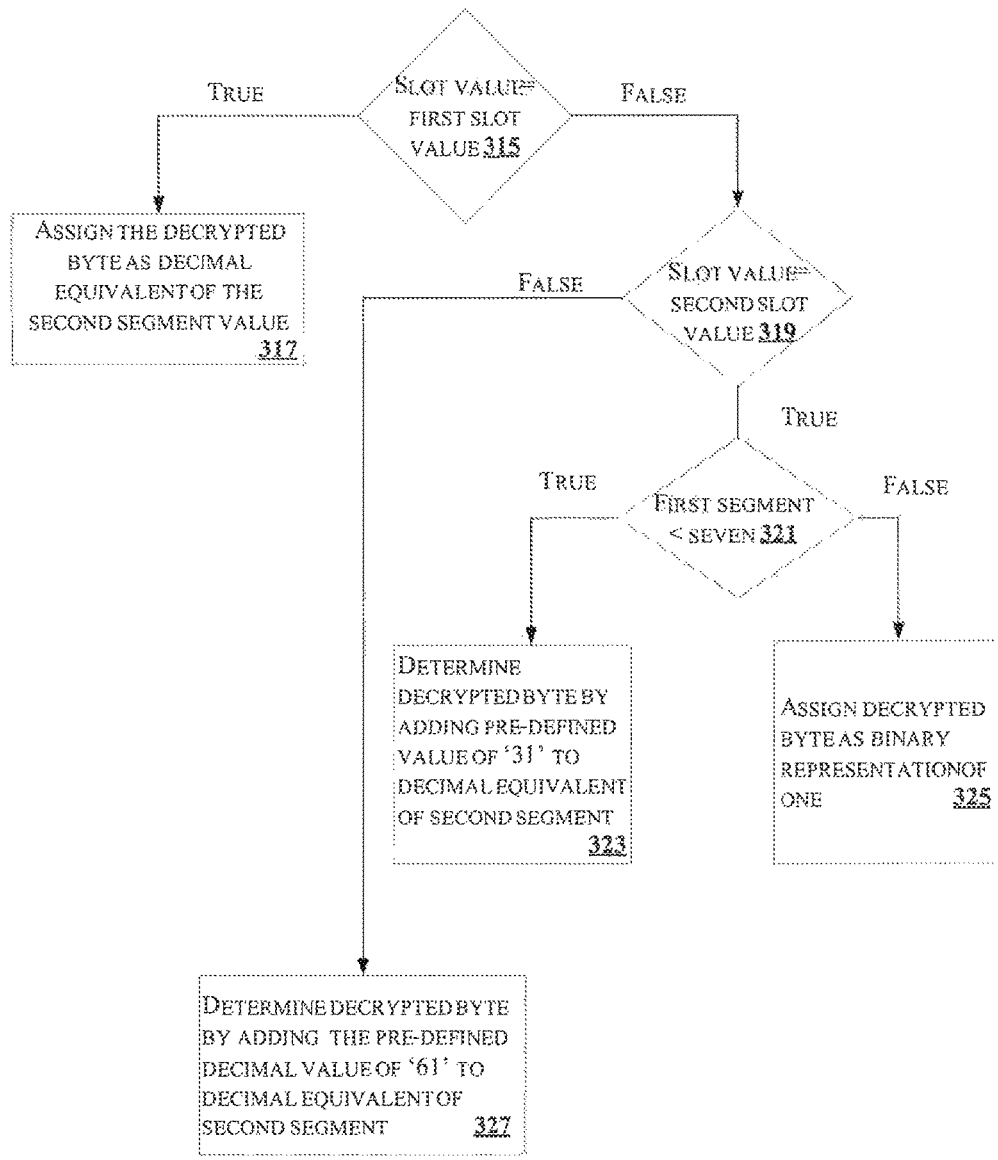
FIG. 3b illustrates a flowchart showing a method for identifying the decrypted byte of an encrypted dataset in accordance with some embodiments of present disclosure.

FIG. 3b illustrates a flowchart showing a method for identifying the decrypted byte of an encrypted dataset in accordance with some embodiments of present disclosure.

At block 315, if the slot value is identified by the decryption dataset generation module $221_C$ as the first slot value, the method proceeds to block 317. Alternatively, if the slot value is not first slot value, the method proceeds to block 319.

At block 317, the decryption dataset generation module 221C assigns the decrypted byte as the binary representation of the decimal value of the second segment value.

At block 319, if the slot value is identified by the decryption dataset generation module 221C as the second slot value, the method proceeds to block 321. Alternatively, if the slot value is not the second slot value, the method proceeds to block 327.

At block 321, if the decryption dataset generation module 221C identifies the first segment of the encrypted byte less than seven, the method proceeds to block 323. Alternatively, if the first segment of the encrypted byte is equal to seven, the method proceeds to block 325.

At block 323, the decryption dataset generation module 221C determines the decrypted byte by adding pre-defined value '31' to the decimal equivalent value of the second segment.

At block 325, the decryption dataset generation module 221C assigns the decrypted byte as the binary representation of one. For example, consider an encrypted byte '11100000' along with the slot value '01'. The first segment of the encrypted byte comprises '111', which is the binary representation of seven and the second segment comprises '00000' which is binary representation of zero. In an embodiment, the first segment with '111' indicates that the decrypted byte has either seven or eight number of binary digit '1's. Further, the corresponding slot value is checked, which indicates the second slot value. Further, as the number of binary digit '1' is identified as equal to seven, the decrypted byte is represented as the binary equivalent of one. Therefore the decrypted dataset for the '11100000' is '11111111'.

Figure 2E:
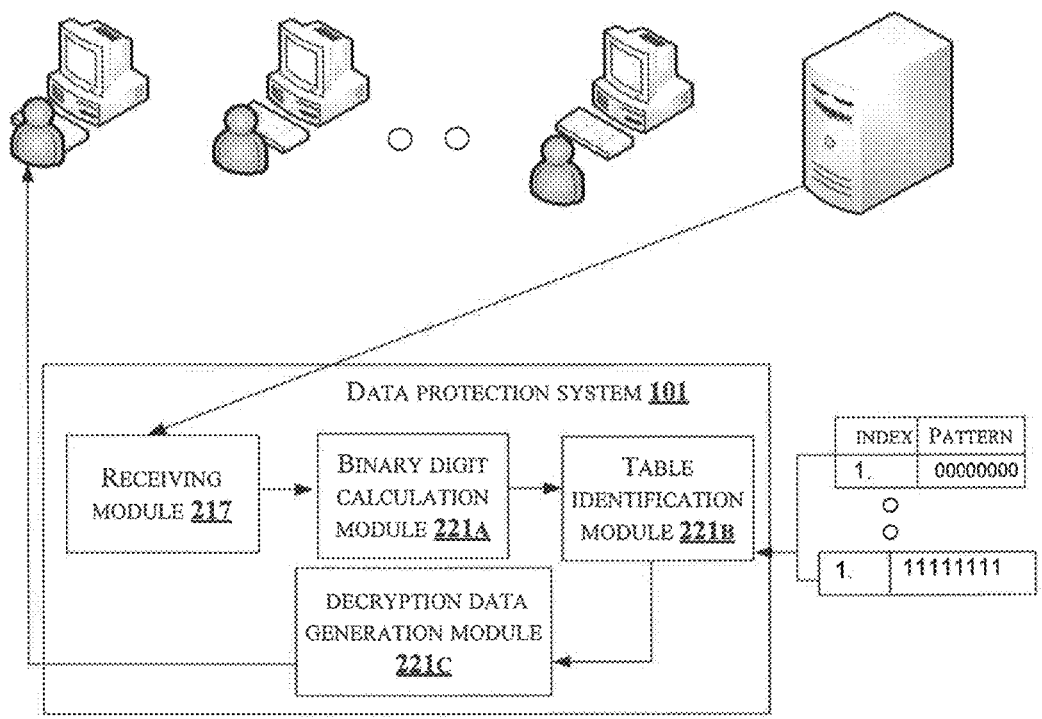
FIG. 2e shows an exemplary environment illustrating data flow between different modules of data protection system for decryption in accordance with some embodiment of the present disclosure.

At block 327, the decryption dataset generation module 221C determines the decrypted byte by adding pre-defined value of '62' to the decimal equivalent of the second segment. FIG. 2e shows an exemplary environment illustrating data flow between different modules of data encryption system for decryption in accordance with some embodiments of the present disclosure.

Figure 4A:
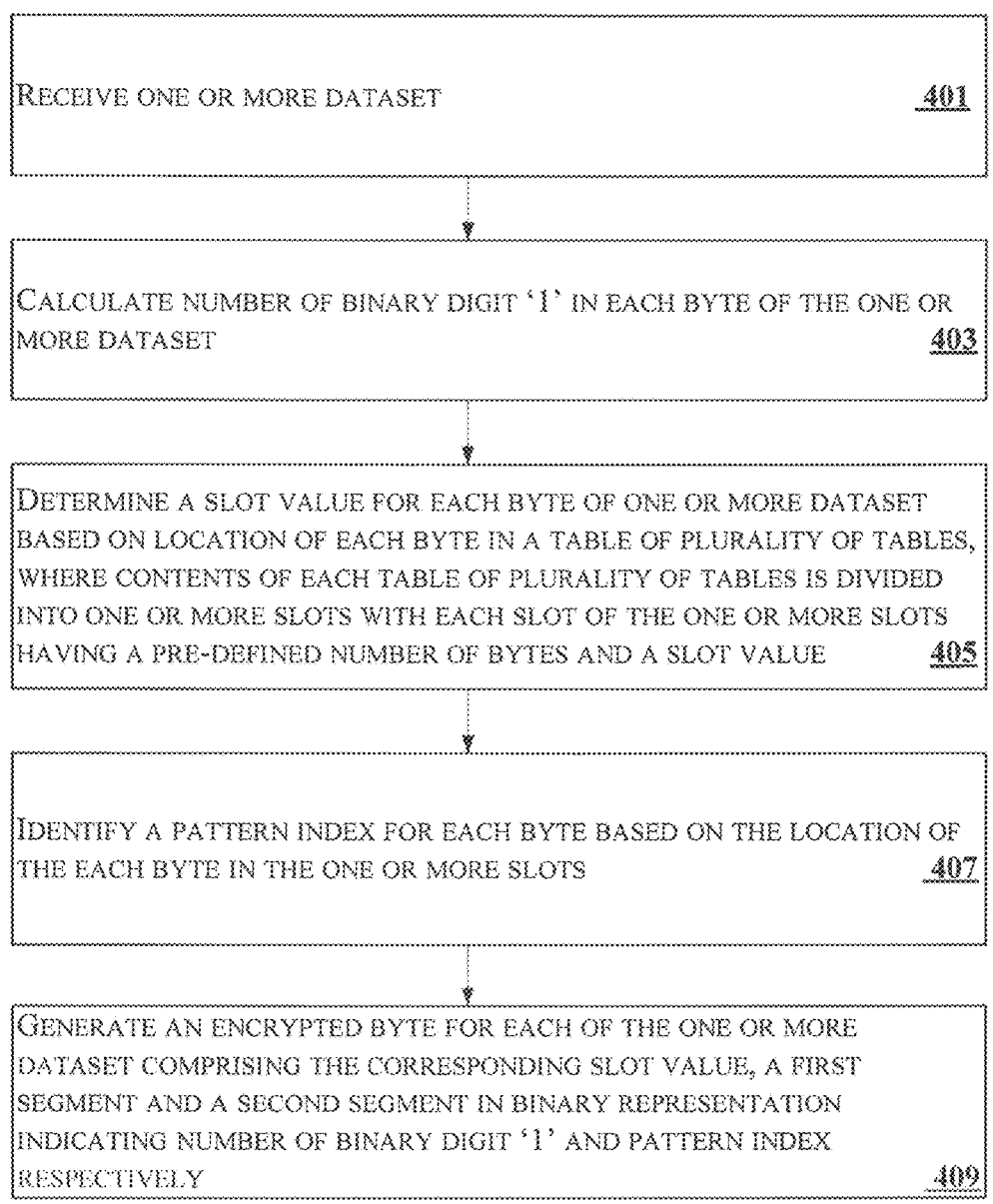
FIG. 4a illustrates a flowchart showing a method for encrypting data in accordance with some embodiments of present disclosure.

FIG. 4a illustrates a flowchart showing a method for encrypting data in accordance with some embodiments of present disclosure.

As illustrated in FIG. 4a, the method 400 comprises one or more blocks for encrypting data. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the data protection system 101 receives one or more dataset for encryption.

At block 403, the data protection system 101 calculates the number of binary digit '1' in each byte of the one or more dataset.

At block 405, the data protection system 101 determines a slot value for each byte of the one or more dataset based on location of each byte in table of plurality of tables, where contents of each table of plurality of tables is divided into one or more slot of the one or more slots having a pre-defined number of bytes and a slot value.

At block 407, the data protection system 101 identifies a pattern index for each byte based on the location of each byte in the one or more slots.

At block 409, the data protection system 101 generates an encrypted byte for each of the one or more dataset comprising the corresponding slot value, a first segment indicating the number of binary digit '1' and second segment indicating the pattern index in binary format.

Figure 4B:
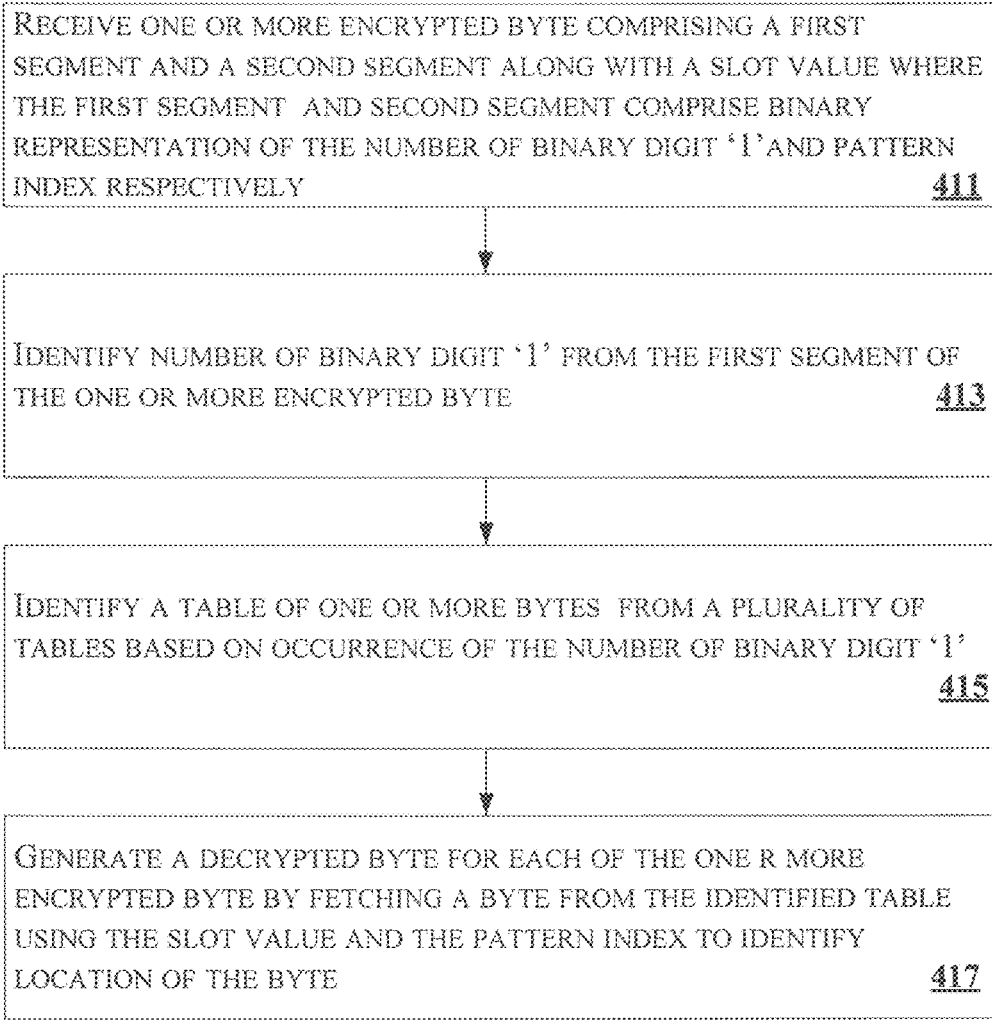
FIG. 4b illustrates a flowchart showing a method for decrypting data in accordance with some embodiments of present disclosure.

FIG. 4b illustrates a flowchart showing a method for decrypting data in accordance with some embodiments of present disclosure.

As illustrated in FIG. 4a, the method 400 comprises one or more blocks for decrypting one or more encrypted dataset. The method 400 may be described in the general context of computer executable instructions. Generally, computer executable instructions can include routines, programs, objects, components, data structures, procedures, modules, and functions, which perform particular functions or implement particular abstract data types.

At block 411, the data protection system 101 receives one or more encrypted byte comprising a first segment and a second segment, along with a slot value wherein the first segment and the second segment comprises of binary representation of the number of binary digit '1' and binary representation of the pattern index respectively.

At block 413, the data protection system 101 identifies number of binary digit '1' from the first segment of the one or more encrypted byte.

At block 415, the data protection system 101 identifies a table of one or more bytes from a plurality of tables based on occurrence of the number of binary digit '1'.

At block 417, the data protection system 101 generates a decrypted byte for each of the one or more encrypted byte by fetching a byte from the identified table using the slot value and the pattern index to identify location of the byte.

Computing System

Figure 5:
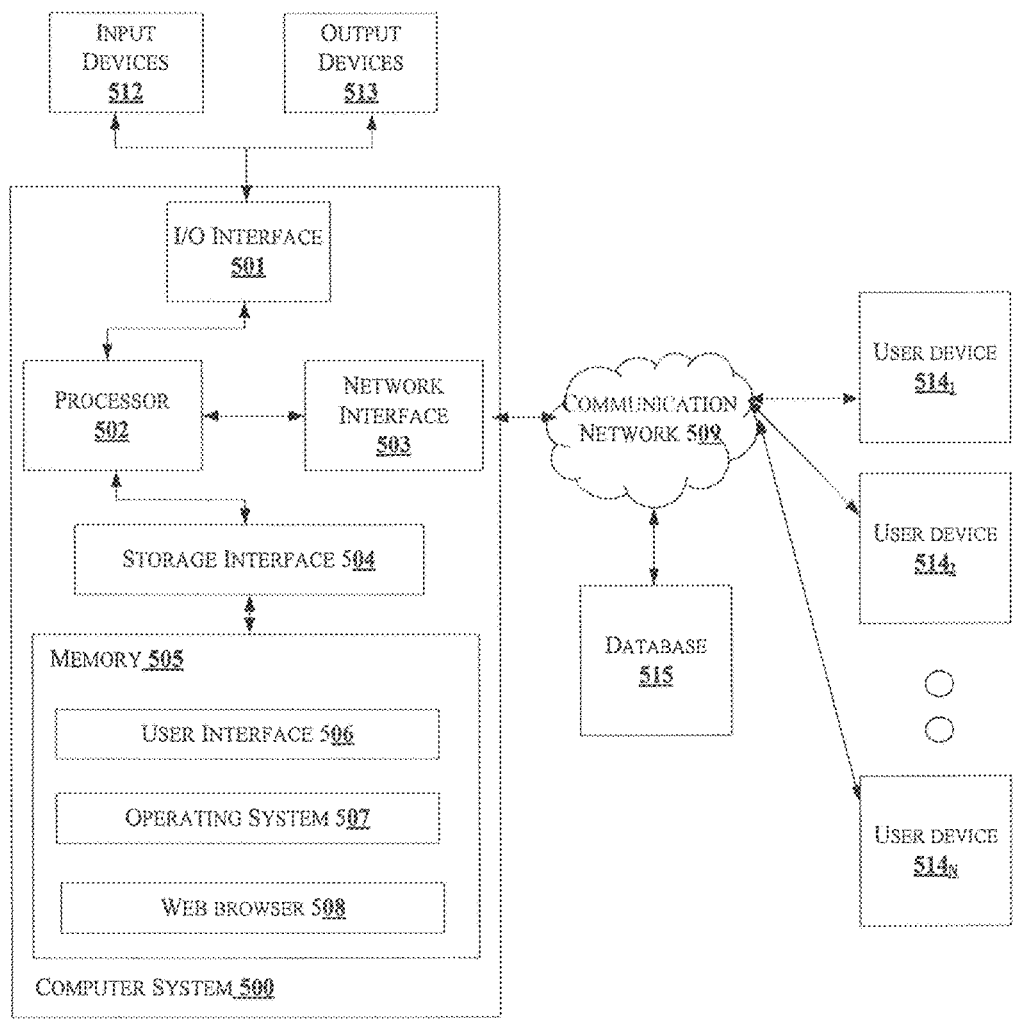
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the data protection system.

The computer system 500 may comprise a central processing unit ("CPU" or "processor") 502. The processor 502 may comprise at least one data processor for encrypting data. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of a data protection system. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with one or more user devices 514 and database 515. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 4) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web browser 508 etc. In some embodiments, computer system 500 may store user/application data 506, such as the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provides an efficient and powerful encryption and decryption technique.

The present disclosure provides countless possibilities for encrypting the data which makes it impossible to crack the encryption unless the actual slot and table details are known.

In an embodiment of the present disclosure, the addition of the slot value provides an additional layer of security to the encrypted data.

In an embodiment, the encryption can be embedded in file system level, where the encryption can be applied to entire storage space or a part of it.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral numerals: | |
|---|---|
| Reference Number | Description |
| 100 | Environment |
| 101 | Data protection system |
| 103 | User devices |
| 105 | Database |
| 107 | I/O interface |
| 109 | Memory |
| 111 | Processor |

-continued

Referral numerals:

| Reference Number | Description |
| --- | --- |
| 113 | Communication network |
| 200 | Data |
| 201 | Input data |
| 203 | Table generation data |
| 205 | Slot value data |
| 207 | Pattern index data |
| 209 | Encrypted data |
| 211 | Decrypted data |
| 213 | Other data |
| 215 | Modules |
| 217 | Receiving module |
| 219 | Encryption module |
| 219A | Table generation module |
| 219B | Binary digit calculation module |
| 219C | Slot value determination module |
| 219D | Pattern index identification module |
| 219E | Encryption determination module |
| 221 | Decryption module |
| 221A | Binary digit calculation module |
| 221B | Table identification module |
| 221C | Decryption data generation module |
| 223 | Other modules |

What is claimed is:

1. A method for encrypting data, the method comprising:
receiving, by a data protection system comprising a processor and a memory, one or more datasets;
calculating, by the data protection system, a number of binary digits '1' in each byte of the one or more datasets;
determining, by the data protection system, a slot value for the each byte of the one or more datasets based on a location of the each byte in a table of a plurality of tables, wherein contents of each table of the plurality of tables is divided into one or more slots with each slot of the one or more slots having a predefined number of bytes and a slot value, wherein each table of the plurality of tables is differentiated based on the number of binary digits '1' in the each byte;
identifying, by the data protection system, a pattern index for the each byte based on the location of the each byte in the one or more slots; and
generating, by the data protection system, an encrypted byte for the each byte of the one or more datasets, the encrypted byte comprising the corresponding slot value, a first segment indicative of a binary representation of the number of binary digits '1' and a second segment indicative of a binary representation of the pattern index.

2. The method as claimed in claim 1, wherein the number of binary digits '1' is less than eight.

3. The method as claimed in claim 1, wherein the slot value for the each byte of the one or more datasets comprises at least one of a first slot value, a second slot value and a third slot value.

4. The method as claimed in claim 3, wherein the first slot value, the second slot value and the third slot value are respectively assigned with a predefined decimal number.

5. The method as claimed in claim 4, wherein the pattern index is obtained by subtraction of the predefined decimal number of the respective slot with a location number of the each byte of the one or more datasets in the table wherein the location number is based the location of the each byte in the table.

6. The method as claimed in claim 1 further comprising generating the encrypted byte when the each byte of the one or more datasets has a number of binary digits '1' equal to eight by allocating the slot value to a second slot, the first segment of three bits indicative of a binary representation of seven and the second segment of five bits with each bit represented by '0'.

7. A data protection system for encrypting data comprising:
a processor; and
a memory communicatively coupled to the processor, wherein the memory stores processor instructions, which, on execution, causes the processor to:
receive one or more datasets;
calculate a number of binary digits '1' in each byte of the one or more datasets;
determine a slot value for the each byte of the one or more datasets based on a location of the each byte in a table of a plurality of tables, wherein contents of each table of the plurality of tables is divided into one or more slots with each slot of the one or more slots having a predefined number of bytes and a slot value, wherein each table of the plurality of tables is differentiated based on the number of binary digits '1' in the each byte;
identify a pattern index for the each byte based on the location of the each byte in the one or more slots; and
generate an encrypted byte for the each byte of the one or more datasets, the encrypted byte comprising the corresponding slot value, a first segment indicative of a binary representation of the number of binary digits '1' and a second segment indicative of a binary representation of the pattern index.

8. The data protection system as claimed in claim 7, wherein the number of binary digits '1' is less than eight.

9. The data protection system as claimed in claim 7, wherein the slot value for the each byte of the one or more datasets comprises at least one of a first slot value, a second slot value and a third slot value.

10. The data protection system as claimed in claim 9, wherein the processor respectively assigns the first slot value, the second slot value and the third slot value with a predefined decimal number.

11. The data protection system as claimed in claim 10, wherein the processor obtains the pattern index by subtracting the predefined decimal number of the respective slot with a location number of the each byte of the one or more datasets in the table wherein the location number is based the location of the each byte in the table.

12. The data protection system as claimed in claim 7, wherein the processor further generates the encrypted byte when the each byte of the one or more datasets has a number of binary digits '1' equal to eight by allocating the slot value to a second slot, the first segment of three bits indicative of a binary representation of seven and the second segment of five bits with each bit represented by '0'.

13. A non-transitory computer readable medium including instruction stored thereon that when processed by at least one processor cause a data protection system to perform operation comprising:
receiving one or more datasets;
calculating a number of binary digits '1' in each byte of the one or more datasets;
determining a slot value for the each byte of the one or more datasets based on a location of the each byte in a table of a plurality of tables, wherein contents of each table of the plurality of tables is divided into one or more slots with each slot of the one or more slots having a predefined number of bytes and a slot value, wherein each table of the plurality of tables is differentiated based on the number of binary digits '1' in the each byte;

identifying a pattern index for the each byte based on the location of the each byte in the one or more slots; and generating an encrypted byte for the each byte of the one or more datasets, the encrypted byte comprising the corresponding slot value, a first segment indicative of a binary representation of the number of binary digits '1' and a second segment indicative of a binary representation of the pattern index.

14. The medium as claimed in claim 13, wherein the number of binary digits '1' is less than eight.

15. The medium as claimed in claim 13, wherein the instruction further causes the processor to generate the encrypted byte when the each byte of the one or more datasets has a number of binary digits '1' equal to eight by allocating the slot value to a second slot, the first segment of three bits indicative of a binary representation of seven and the second segment of five bits with each bit represented by '0'.

16. The medium as claimed in claim 13, wherein the slot value for the each byte of the one or more datasets comprises at least one of a first slot value, a second slot value and a third slot value.

17. The medium as claimed in claim 16, wherein the instruction causes the processor to respectively assign the first slot value, the second slot value and the third slot value with a predefined decimal number.

18. The medium as claimed in claim 13, wherein the instruction causes the processor to obtain the pattern index by subtracting the predefined decimal number of the respective slot with a location number of the each byte of the one or more datasets in the table wherein the location number is based the location of the each byte in the table.

19. A method for decrypting an encrypted dataset, the method comprising:

receiving, by a data protection system comprising a processor and a memory, one or more encrypted bytes comprising a first segment and a second segment, along with a slot value wherein the first segment and the second segment comprises a binary representation of a number of binary digits '1' and a binary representation of a pattern index respectively;

identifying, by the data protection system, the number of binary digits '1' from the first segment of the one or more encrypted bytes;

identifying, by the data protection system, a table of one or more bytes from a plurality of tables based on an occurrence of the number of binary digits '1'; and generating, by the data protection system, a decrypted byte for each of the one or more encrypted bytes by fetching a byte from the identified table using the slot value and the pattern index to identify a location of the byte.

20. The method as claimed in claim 19, wherein the slot value for the one or more encrypted bytes comprises one of a first slot value, a second slot value and a third slot value.

21. The method as claimed in claim 19, wherein the pattern index is added with the predefined decimal number of the respective slot value to identify the location of each byte in the table.

22. The method as claimed in claim 19, wherein the decrypted byte is considered as having all '1' bit values when the second segment of five bits are all '0' bit values, the first segment of three bits are all '1' bit values and the slot value corresponds to a second slot.

23. A data protection system for decrypting an encrypted dataset comprising:

a processor; and a memory communicatively coupled to the processor, wherein the memory stores processor instructions, which, on execution, causes the processor to:

receive one or more encrypted bytes comprising a first segment and a second segment, along with a slot value wherein the first segment and the second segment comprises a binary representation of a number of binary digits '1' and a binary representation of a pattern index respectively;

identify the number of binary digits '1' from the first segment of the one or more encrypted bytes;

identifying a table of one or more bytes from a plurality of tables based on an occurrence of the number of binary digits '1'; and generate a decrypted byte for each of the one or more encrypted bytes by fetching a byte from the identified table using the slot value to identify a slot from the identified table and the pattern index to identify a location of the byte in the slot.

24. The data protection system as claimed in claim 23, wherein the slot value for the one or more encrypted bytes comprises one of a first slot value, a second slot value and a third slot value.

25. The data protection system as claimed in claim 23, wherein the processor adds the pattern index with the predefined decimal number of the respective slot value to identify the location of each byte in the table.

26. The data protection system as claimed in claim 23, wherein the decrypted byte is considered as having all '1' bit values when the second segment of five bits are all '0' bit values, the first segment of three bits are all '1' bit values and the slot value corresponds to a second slot.

27. A non-transitory computer readable medium including instruction stored thereon that when processed by at least one processor cause a data protection system to perform operation comprising:

receiving one or more encrypted bytes comprising a first segment and a second segment, along with a slot value wherein the first segment and the second segment comprises a binary representation of a number of binary digits '1' and a binary representation of a pattern index respectively;

identifying the number of binary digits '1' from the first segment of the one or more encrypted bytes;

identifying a table of one or more bytes from a plurality of tables based on an occurrence of the number of binary digits '1'; and generating a decrypted byte for each of the one or more encrypted bytes by fetching a byte from the identified table using the slot value to identify a slot from the identified table and the pattern index to identify a location of the byte in the slot.

28. The medium as claimed in claim 27, wherein the slot value for the one or more encrypted bytes comprises one of a first slot value, a second slot value and a third slot value.

29. The medium as claimed in claim 27, wherein the processor adds the pattern with a predefined decimal number of the respective slot value to identify the location of each byte in the table.

30. The medium as claimed in claim 27, wherein the decrypted byte is considered as having all '1' bit values when the second segment of five bits are all '0' bit values, the first segment of three bits are all '1' bit values and the slot value corresponds to a second slot.

\* \* \* \* \*